(12) United States Patent
Facinelli et al.

(10) Patent No.: US 8,722,844 B1
(45) Date of Patent: May 13, 2014

(54) METHODS FOR PREPARING POLYAMIDE COMPOSITIONS

(71) Applicant: Honeywell International Inc., Morristown, NJ (US)

(72) Inventors: John V. Facinelli, Morristown, NJ (US); Timothy J. Kraft, Morristown, NJ (US); Robbyn L. Prange, Midland, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/678,000

(22) Filed: Nov. 15, 2012

Related U.S. Application Data

(60) Provisional application No. 61/559,901, filed on Nov. 15, 2011.

(51) Int. Cl.
*C08G 64/00* (2006.01)
*C08G 63/02* (2006.01)

(52) U.S. Cl.
USPC .......................... 528/271; 528/272; 528/313

(58) Field of Classification Search
USPC ........................................ 528/271, 272, 313
See application file for complete search history.

(56) References Cited

U.S. PATENT DOCUMENTS

| | | |
|---|---|---|
| 5,248,872 A | 9/1993 | Stewart |
| 6,069,228 A | 5/2000 | Alsop et al. |
| 6,429,279 B1 | 8/2002 | Hunger et al. |
| 6,693,163 B2 | 2/2004 | Tanaka et al. |

FOREIGN PATENT DOCUMENTS

EP 1007482 B1 11/2003

*Primary Examiner* — Terressa Boykin
(74) *Attorney, Agent, or Firm* — Faegre Baker Daniels LLP (57) ABSTRACT

A polyamide composition is formed by combining a phosphorous containing catalyst with monomer starting materials under conditions suitable to cause polymerization of the monomer starting material into a low molecular weight polyamide material. The polyamide material, which may include remaining or residual catalyst, is then further polymerized via solid state polycondensation at a temperature suitable to form a high molecular weight polyamide material. The presence of the catalyst results in increased solid state polymerization rate and a final polyamide material composition with increased viscosity and a higher molecular weight.

20 Claims, 8 Drawing Sheets

METHODS FOR PREPARING POLYAMIDE COMPOSITIONS

RELATED APPLICATION

This application claims the benefit of U.S. Provisional Application Ser. No. 61/559,901 filed Nov. 15, 2011 and entitled "METHODS FOR PREPARING POLYAMIDE COMPOSITIONS", which application is incorporated by reference herein in its entirety.

FIELD OF THE INVENTION

The present invention is generally related to the field of polyamides. In particular, the present invention is related to high molecular weight polyamide compositions and methods of making such polyamide compositions using solid state polymerization.

DESCRIPTION OF RELATED ART

Polyamides are a class of polymers which have been used for many years for numerous practical applications. They are prepared by various processes, are synthesized from widely differing starting materials, and for special applications can be made up into materials with specially adjusted combinations of properties, either alone or in combination with processing auxiliaries, stabilizers, polymeric alloying components (e.g. elastomers) or reinforcing materials (e.g. mineral fillers or glass fibres).

Production of polyamides such as Nylon-6, typically involves the hydrolytic polymerization of lactams. The steps of hydrolytic polymerization of lactams includes initiation, addition polymerization and melt polycondensation. During the melt polycondensation step, the molecular weight of the polyamide increases. Owing to the very rapid increase in melt viscosity with increasing molecular weight, however, melt polymerization is most efficient for the preparation of relatively low molecular weight and low viscosity products.

Solid state polycondensation is a known method for increasing the molecular weight of polyamides. Although the solid state polycondensation process is used industrially on a large scale for the production of relatively high molecular weight polyamides, one challenge with the process is the relatively low rates achieved and resulting productivity limitations, as well as the high energy input required.

SUMMARY OF THE INVENTION

One embodiment is a method for forming polyamide materials, in which a phosphorous containing catalyst is combined with monomer starting materials under conditions suitable to cause polymerization of the monomer starting material into a low molecular weight polyamide material. The polyamide is then extracted to remove excess monomer and oligomer content to render the polyamide suitable for commercial application. A quantity of the phosphorous containing catalyst may also be removed during the extraction process. The dried polyamide material, which may include remaining or residual catalyst, is then further polymerized via solid state polycondensation at a temperature suitable to form a high molecular weight polyamide material. The presence of the catalyst results in increased solid state polymerization rate and a final polyamide material composition with increased viscosity and a higher molecular weight.

DETAILED DESCRIPTION

Figure 1:
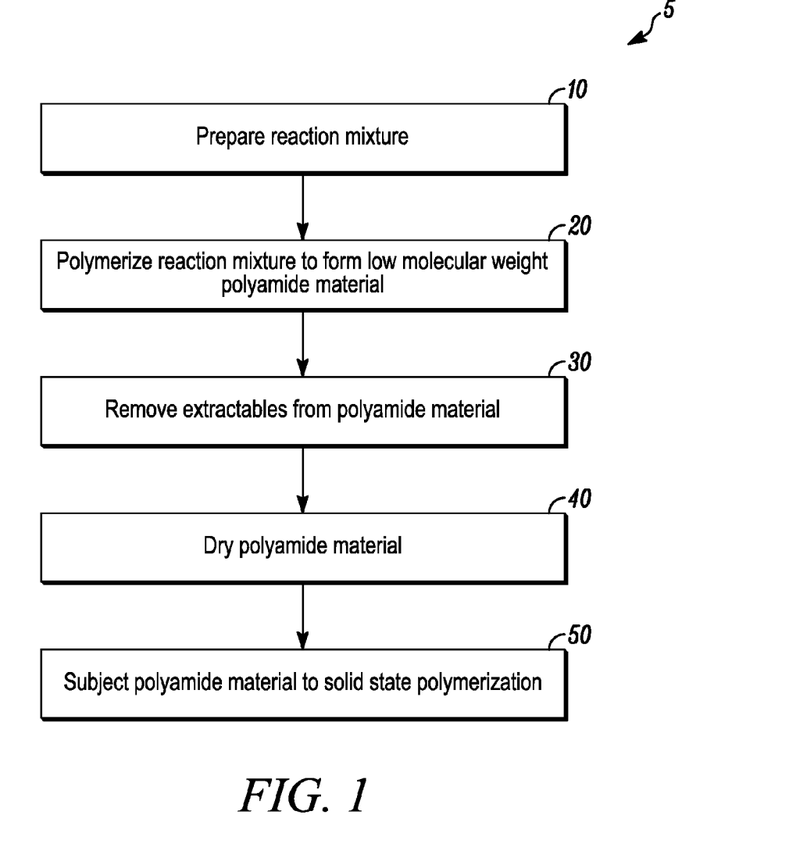
FIG. 1 is a flowchart illustrating a method of forming a polyamide composition according to embodiments of the present invention.

FIG. 1 is a flow chart illustrating a method 5 for forming high molecular weight polyamides. Although the method is discussed with reference to the formation of polyamide-6, similar methods could be employed to form a variety of known polyamide materials.

The method 5 includes the steps of preparing a reaction mixture by combining at least one monomer starting material and at least one phosphorous containing compound (Block 10). These materials are then polymerized at high temperatures (e.g., above the melt temperature of the product polymer) to form a low molecular weight polyamide material (Block 20). The polyamide material is then washed to remove extractables (e.g., monomers and oligomers) (Block 30) with at least some residual catalyst still present, and dried to reduce the moisture content of the polyamide material (Block 40). The dried polyamide material with residual catalyst is then subjected to a solid state polymerization process at a reduced temperature (e.g., above the glass transition temperature but below the melting temperature of the polymer) to form a high molecular weight polyamide material (Block 50).

Form Reaction Mixture (Block 10)

The starting materials for forming various polyamides are known. For certain polyamides, these materials include a lactam, water and/or an aminocarboxylic acid. Copolymers may also be formed with the addition of a diacid and diamine in approximately stoichiometric ratio to the previously stated reactants. Exemplary lactams include, but are not limited to: caprolactam, valerolcatam, enantholactam, capryllactam, undecalactam and laurolactam. A particularly suitable lactam is caprolactam. For hydrolytic polymerization of caprolactam, the water content of the reactants is typically between about 0.5% and about 3%. Exemplary aminocarboxylic acids include, but are not limited to: aminocaproic acid (ACA), aminoheptanoic acid, aminooctanoic acid, aminononanoic acid, aminodecanoic acid, aminoundecanoic acid, and aminiododecanoic acid. A particularly suitable aminocarboxylic acid is aminocaproic acid. When caprolactam and aminocaproic acid are used as the starting materials, polyamide-6 is formed. When the 1:1 salt of adipic acid and hexamethylene diamine is used, polyamide-6,6 is formed.

A phosphorous containing catalyst is also added as a starting material prior to the initial polymerization step. Suitable phosphorous catalysts include phosphorous acid, phosphonic acid; alkyl and aryl substituted phosphonic acid; hypophosphorous acid; alkyl, aryl and alkyl/aryl substituted phosphinic acid; and phosphoric acid; as well as the alkyl, aryl and alkyl/aryl esters, metal salts, ammonium salts, and ammonium alkyl salts of these various phosphorus containing acids. As used herein, "alkyl/aryl" refers to those combinations where there is more than one organic substituent. In the substituted acids, the alkyl or aryl group replaces the hydrogen connected directly to the phosphorous atom. The esters are formed conventionally with the alkyl or aryl group replacing the hydrogen of an —OH group comprising the acid. Commercially available phosphorous containing catalysts that may be suitable include Irgamond 195, Irgamond 295 and aqueous hypophosphorous acid. Particularly suitable catalysts include phosphorous acid, hypophosphorous acid, phosphoric acid and salts thereof. Particularly suitable catalysts include phosphorous acid, hypophosphorous acid, phosphoric acid and salts thereof.

Sufficient catalyst is added as a starting material so that residual catalyst (determined analytically on phosphorous basis) exists after polymerization and polymer washing has been completed. In some embodiments, sufficient catalyst is provided such that an initial phosphorous content is at least about 1 ppm, at least about 3 ppm, at least about 5 ppm, at least about 10 ppm, at least about 20 ppm, or at least about 30 ppm.

In one embodiment, sufficient catalyst is added to the reaction mixture to provide at least about 1 ppm phosphorous, more particularly at least about 5 ppm phosphorous in the reaction mixture, more particularly, at least about 10 ppm phosphorous, even more particularly, at least about 15 ppm phosphorous, and even more particularly, at least about 20 ppm phosphorous or at least about 30 ppm phosphorous. In other embodiments, the amount of catalyst added to the reaction mixture may be as low as 1 ppm, 3 ppm, 5 ppm or 10 ppm, and may be as high as 15 ppm, 20 ppm, or 30 ppm, or within any range defined between any pair of the foregoing values. The starting materials may be combined to form the reaction mixture via batch or continuous addition processes.

Polymerize Reaction Mixture (Block 20)

The reaction mixture is then subjected to conditions suitable for causing hydrolysis and polymerization of the lactam material to form a low molecular weight polyamide material. The hydrolysis/polymerization processes may be carried out in one or more reaction vessels under suitable pressure, temperature and time conditions. Suitable pressure conditions may range from atmospheric pressure to about 80 psig. Suitable temperature conditions include temperatures that are above the polymer melting temperature. In some embodiments, suitable temperature conditions may range from about 200 to about 270 degrees Celsius. Suitable reaction times may range from about 1 to about 24 hours.

The resulting polyamide material may then be formed into pellets by chilling an extruded melt stream of the polymer and then pelletizing the solidified extrusion material. In one embodiment, prior to solid state polymerization, catalyst is added to the polymer material. For example, catalyst in suitable solvent may be added directly to the polymer melt prior to solidification, and/or catalyst in suitable solvent may be added to the pellet surface following the washing step using spray or mist techniques. Catalyst may added to the polymer melt or to the pellet surface, or as an alternative, to the starting material. Accordingly, in one embodiment, catalyst is not added to the starting materials but is added to the melt and/or applied to the pellet surface.

Remove Extractables (Block 30)

Once pelletized, the polyamide pellets are washed to remove excess extractables. Washing (also referred to as leaching) is generally carried out by contacting the pellets with one or more hot water washes, some of which may optionally include additional components such as caprolactam. As discussed above, sufficient catalyst may be added to the reaction mixture such that residual phosphorous containing catalyst still remains in the polyamide material after washing. In one embodiment, the polyamide materials include sufficient residual catalyst that at least about 0.1 ppm phosphorous is present, more particularly, at least about 0.5 ppm, even more particularly at least 1 ppm, and even more particularly at least 3 ppm phosphorous is present, or the residual phosphorous is as high as about 5 ppm, more particularly, at least about 10 ppm, even more particularly, at least about 15 ppm phosphorous, or any within any range defined between any pair of the foregoing values, may be present after washing. In addition to washing, other processes for removing extractables include supercritical fluid extraction and evaporation via heat and reduced pressure.

Drying (Block 40) and Solid State Polymerization (Block 50)

The washed pellets are then dried under an inert atmosphere at temperatures generally between about 100 and 150 degrees Celsius. After drying for a sufficient period of time, the pellets are subjected to solid state polymerization (SSP) under an inert atmosphere and elevated temperatures. Suitable temperatures for SSP include temperatures above or well above a glass transition temperature of the polymer and temperatures below the melting temperature of the polymer. In some embodiments, suitable temperature ranges for solid state polymerization are between about 140 and 200 degrees Celsius, more particularly, between about 150 and 190 degrees Celsius, even more particularly, between about 165 and about 180 degrees Celsius.

The polyamide material may be subjected to these solid state polymerization conditions for at least about 1 hour, more particularly, at least about 3.5 hours, and even more particularly, at least about 5 hours, depending on temperature, pellet size, molecular weight and desired FAV target. Notably, as shown in the examples below, high molecular weight polyamide materials may be formed from low molecular weight materials containing residual phosphorous catalyst at high SSP rates. In one embodiment, the rate of FAV increase per hour may be at least about 9.6 FAV/hr with an initial catalyst concentration of 10 ppm or greater at a temperature of about 180 degrees Celsius.

After polymerization is complete, various additives may be added to the polyamide pellets depending on anticipated use. The pellets may also be blended with polyamide pellets containing additives prior to packaging and transport.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Examples 1-2 and Comparative Example A

Examples 1-2 were formed by combining into a reaction vessel merchant grade Caprolactam and 6-aminocaproic acid in a ratio of 95:5 along with the catalysts identified in Table 1 below. HPA is a 50 wt % aqueous solution of hypophosphorous acid. Irgamond 195 has the following structure:

Polymerization was conducted in a stainless steel 3 liter agitated reactor equipped with a nitrogen purge and a bottom outlet for strand pelletization. The reactor was charged the day before with about 1500 grams of caprolactam, and about 5% (w/w) or 80 grams of aminocaproic acid as an initiator. The reactor was purged overnight with a nitrogen sweep. Agitation was started 75 minutes after heating commenced when the reaction temperature reached about 65° C. Melt polymerization was carried out for approximately 2.5 hours at a maximum temperature reaching 255° C.

After maintaining the temperature (with continued agitation) for a predetermined target amount of time, agitation was stopped and the polymer was strand extruded into a quench water bath (15-20° C.) and fed into a pelletizer to produce nylon pellets. The FAV of the pellets was then measured according to ASTM D789-07 as set forth in Table 1.

TABLE 1

| Example | Catalyst | Cat. Amount | P Amount (Calculated) | FAV |
|---|---|---|---|---|
| 1 | 50% HPA (aq) | 0.16 g | 100 ppm | 66.9 |
| 2 | Irgamond 195 | 1.606 g | 1000 ppm | 58.7 |

The polyamide pellets of Examples 1 and 2 and Comparative Example A were then washed 5 times in deionized water to remove extractables (four times for about one hour and one time for about two hours). The water temperature was maintained in the range of between about 90 and about 100° C. The samples were first air dried and were then dried in a vacuum oven for 2 days. Comparative Example A is a Nylon-6 material sold by Honeywell International under the product designation H73ZP.

After washing, Examples 1 and 2 and Comparative Example A were subjected to a solid state polymerization (SSP) procedure. For each example, SSP was carried out on 80-100 g of pellets in a cylindrical reactor with an Nitrogen flow rate of 300 ml/min. The reactor and loop were submerged in a fluidized sand bath having a temperature of 190° C., and after the indicated reaction time, the reactor was pulled from the sand bath and FAV was measured according to ASTM D789-07. After SSP, the reactor was purged with nitrogen air flow at 300 ml/min until temperature was reduced to 130° C. The results are shown in Table 2.

TABLE 2

| Example | Time (min) | Reactor Temp (° C.) | FAV |
|---|---|---|---|
| Ex. 1 | 0 | 22 | 76.6 |
| | 60 | 182 | 90.1 |
| | 90 | 184 | 103 |
| | 120 | 184 | 134 |
| | 150 | 184 | 153 |

TABLE 2-continued

| Example | Time (min) | Reactor Temp (° C.) | FAV |
|---|---|---|---|
| Ex. 2 | 0 | 22 | 72.4 |
| | 60 | 182 | 82.4 |
| | 90 | 184 | 92.3 |
| | 120 | 184 | 86.9 |
| | 150 | 176 | 86.4 |
| Comp. A | 00 | 182 | 77.7 |
| | 90 | 184 | 81.1 |
| | 120 | 182 | 86.0 |
| | 150 | 184 | 88.2 |

The results demonstrate that Example 1 utilizing hypophosphorous acid (HPA) catalyst exhibited a higher increase in FAV, and therefore a higher SSP rate, over the same time period as either Example 2 or Comparative Example A.

Examples 3-4 and Comparative Example B

Figure 2:
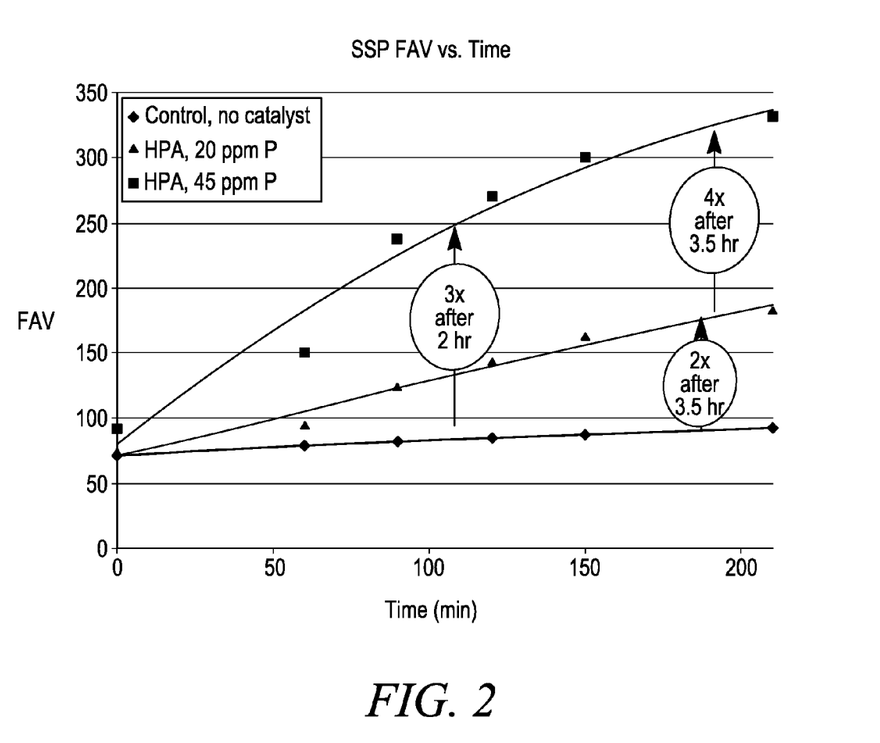
FIG. 2 is a graph illustrating SSP rates at various initial phosphorous concentrations.

The effect of the initial concentration of the HPA catalyst used in Example 1 was tested by adding sufficient catalyst in the initial reaction mixtures so that 20 ppm phosphorous was included in Example 3 and 45 ppm phosphorous was included in Example 4. Comparative Example B utilized the same material as Comparative Example A. SSP was carried out for 240 minutes in the manner set forth in Example 1 with FAV testing at periodic time intervals. FIG. 2 is a line graph illustrating the FAV increase over time of each Example. Example 3 exhibited a FAV increase of approximately 2 times that of Comparative Example A after 240 minutes. Example 4 exhibited a FAV increase of approximately 4 times that of Comparative Example A after 240 minutes.

These results indicate a correlation between increased catalyst added prior to melt polymerization and an increased SSP rate.

Examples 5-9 and Comparative Example C

Figure 3:
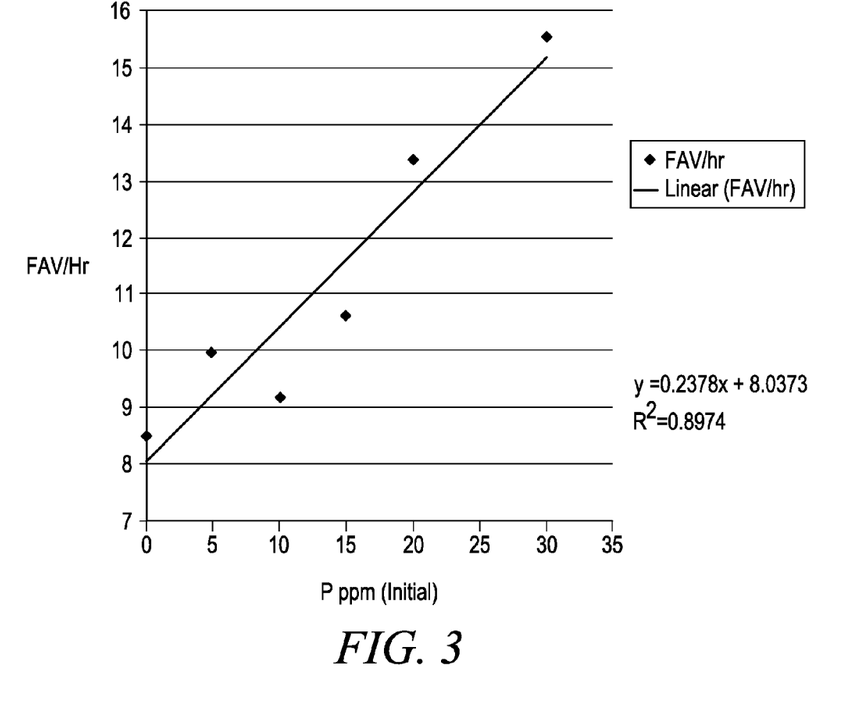
FIG. 3 is a graph illustrating SSP rate in FAV/hour of an embodiment of the present invention.

The polymers of Examples 5-9 were formed as set forth in Example 1 above except that varying levels of HPA catalyst were added prior to melt polymerization as set forth in Table 3, below. Comparative Example C was the same as Comparative Example A. SSP was carried out for 240 minutes in the manner set forth in Example 1, with temperature controlled to 180° C., and FAV testing at periodic time intervals. From this data, FAV increase per hour was determined. Results set forth in Table 3 and FIG. 3, indicate that the target FAV/hr rate of greater than 10 can be achieved with at least about 15 ppm phosphorous concentration based on the initially added catalyst.

TABLE 3

| Example | Comp. C | 5 | 6 | 7 | 8 | 9 |
|---|---|---|---|---|---|---|
| PPM P | 0 | 5 | 10 | 15 | 20 | 30 |
| Slope | 8.51 | 9.99 | 9.2 | 10.61 | 13.39 | 15.55 |
| $R^2$ | 0.997 | 0.99 | 0.99 | 0.99 | 0.977 | 0.993 |

Examples 10-11

Figure 4:
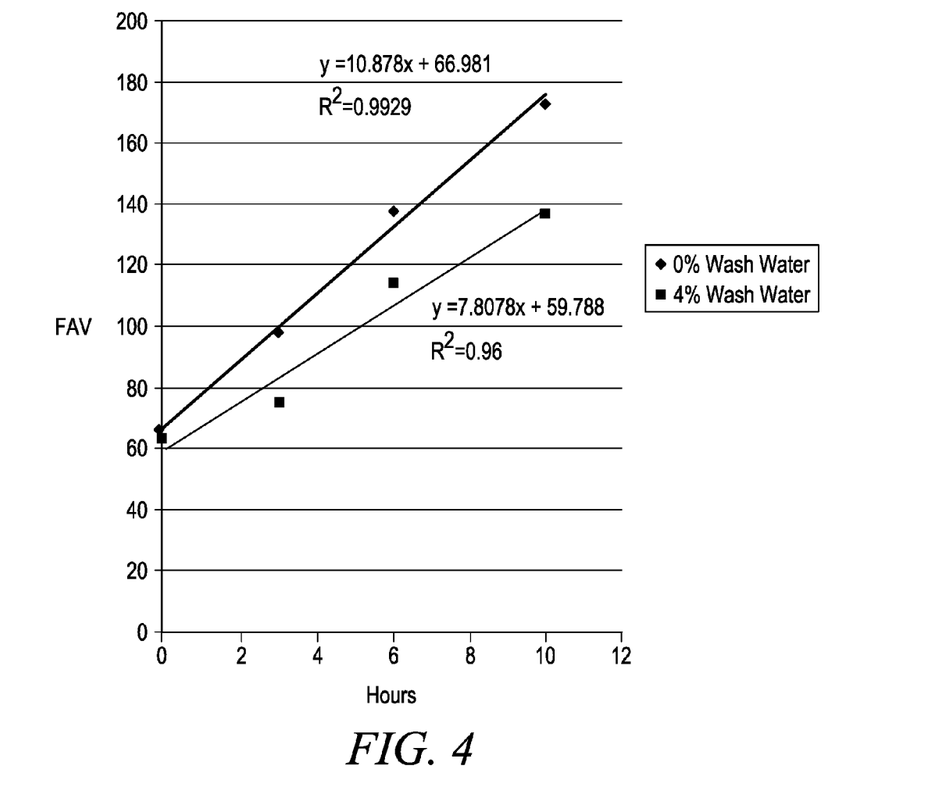
FIG. 4 is a graph illustrating the effect of various wash compositions on SSP rate.

Examples 10-11 were each prepared with sufficient HPA catalyst to provide 20 ppm initial Phosphorous concentration, however, Example 10 was leached in water containing 0 wt % caprolactam while Example 11 was leached in water containing 4 wt % caprolactam. After washing, the phosphorous concentration of both examples was measured by by digesting the nylon with nitric and sulfuric acids, heating with sodium molybdate and hydrazine sulfate reagents and measuring absorbance at 830 nm relative to standards. Example 10 still included about 20 ppm residual phosphorous prior to SSP, while Example 11 had about 10 ppm residual phosphorous. FIG. 4 illustrates the difference in FAV between Examples 10 and 11, and indicates that the amount of residual phosphorous catalyst impacts SSP rate.

Examples 12-16

Having determined that the leaching process may impact residual catalyst amounts, Examples 12-16 were performed to determine residual catalyst amounts based on a range of initial catalyst amounts. The results are shown in Table 4.

TABLE 4

| Example | 12 | 13 | 14 | 15 | 16 |
|---|---|---|---|---|---|
| Initial PPM | 5 | 10 | 15 | 20 | 30 |
| Residual PPM | 4.5 | 9 | 11 | 22 | 17 |
| % Residual | 90 | 90 | 73 | 110 | 57 |

Examples 17-21

Examples 17-21 were formulated as set forth in Example 1 with varying levels of hypophosphorous acid as measured by initial phosphorous content. Residual phosphorous was measured prior to and after washing. FAV rate was then measured during SSP (180° C.) at 6 and 10 hour intervals. The results are shown in Table 5.

TABLE 5

| Example | PPM (Calc) | PPM (unwashed) | PPM (washed) | FAV Rate (6 h) | FAV Rate (10 h) |
|---|---|---|---|---|---|
| 17 | 0 | 0 | 0 | 9.9 | 9.3 |
| 18 | 5 | 5.1 | <2.1 | 11.4 | 10.0 |
| 19 | 10 | 8.7 | 9 | 9.5 | 9.4 |
| 20 | 20 | 23 | 22 | 16.4 | 18.4 |
| 21 | 30 | 32 | 17 | 15.6 | 18.2 |

Examples 17-19 indicate that initial P amounts up to about 10 ppm results in similar FAV rates. However, Examples 20-21 indicate that initial P amounts greater than 10 ppm, and even more particularly, 20 ppm or higher, results is substantially increased FAV rates. Accordingly, there appears to be a step-increase of SSP rates when sufficient catalyst is added to provide more than about 10 ppm phosphorous.

Examples 22-24

Figure 5:
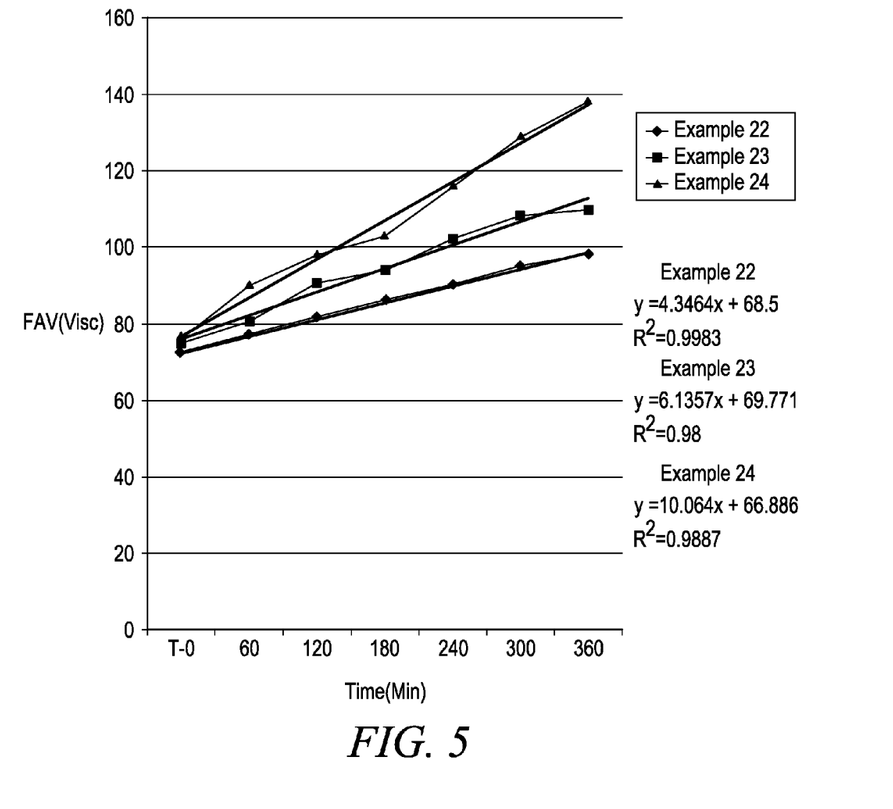
FIG. 5 is a graph illustrating the effect of SSP temperature on SSP rate.

Examples 22-24 measured SSP rates of a medium viscosity nylon product H73ZP available from Honeywell International, Inc., to determine the effect that temperature has on SSP. The results, set forth in FIG. 5 indicate that SSP rates increase with higher temperatures. From this it can be observed that the presence of residual catalyst in combination with higher SSP temperatures could provide an optimum SSP rate.

Examples 25-27

Figure 6:
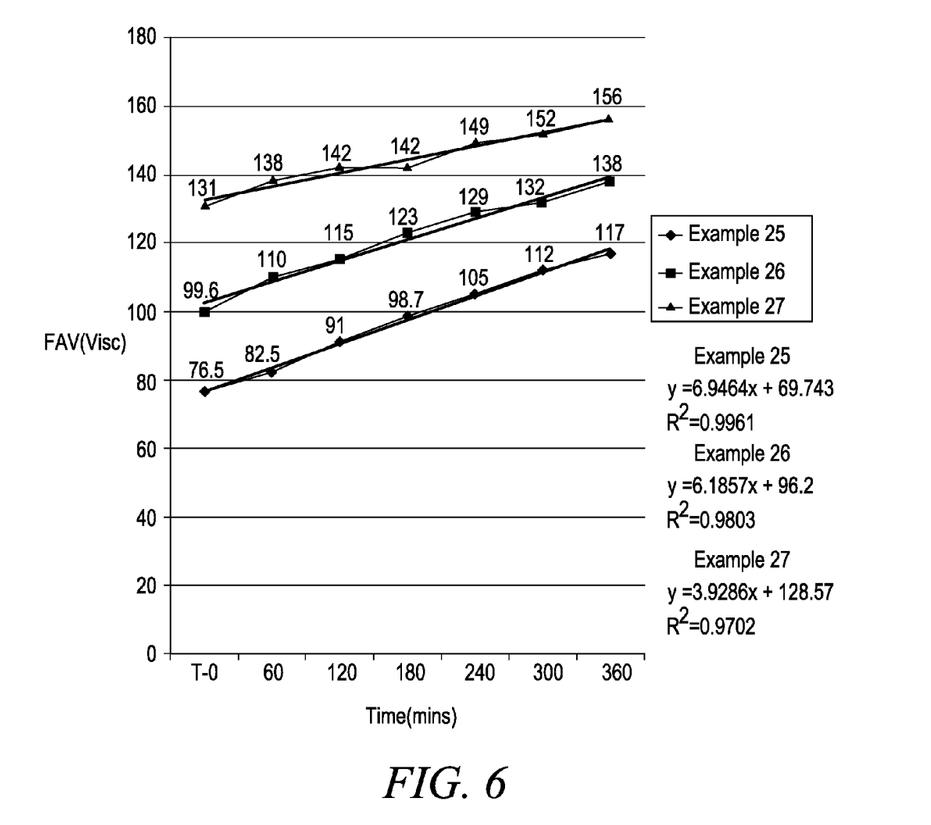
FIG. 6 is a graph illustrating the effect of initial material FAV on SSP rates.

Examples 25-27 measured the SSP rate of three different nylon materials commercially available from Honeywell International Inc. and having different initial FAV values to determine the effect of initial FAV on SSP rate. Example 25 included H73ZP, Example 26 included H100ZP and Example 27 included H135ZP. The graph set forth in FIG. 6 indicates that FAV rate does correlate (decreases) with initial FAV but does not correlate as strongly with residual phosphorous concentration.

Examples 28-34

Examples 28-34 provide additional illustrative examples of the invention in which nylon 6 was melt polymerized with controlled loading of the catalyst (hypophosphorous acid).

Polymerization was conducted in a stainless steel 3 liter agitated reactor equipped with a nitrogen purge and a bottom outlet for strand pelletization. The reactor was charged the day before with about 1520 grams of caprolactam, and about 5% (w/w) or 80 grams of aminocaproic acid as an initiator. The reactor was purged overnight with a nitrogen sweep. Agitation was started 75 minutes after heating commenced when the reaction temperature reached about 65° C. Melt polymerization was carried out for about 6 hours at a maximum temperature reaching 260° C., and proceeded until the stirring motor power consumption reaches a level of 0.40 to 0.45 amps to stir the reactor at a speed of 30 rpm. A hypophosphorous acid solution was quantitatively prepared in water with known concentration. A quantity of hypophosphorous acid solution was quantitatively added to the polymerization reactor to achieve the target level of phosphorous.

The molten nylon was extruded as a strand form the bottom of the reactor, quenched in a water bath and then pellatized using a pelletizer with a rotating chopper blade. The nylon pellet samples (about 825 grams) was leached three times with 4500 grams of deionized water at a temperature of 105° C. to 125° C. for one hour. The FAV of the pellets was measured before and after washing according to ASTM D789-07 as set forth in Table 6. The samples were dried to a moisture content of less than 1000 ppm water.

The compositions were then subjected to a solid state polymerization (SSP) procedure. For each example, SSP was carried out on 80-100 g of pellets in a cylindrical reactor with an Nitrogen flow rate of 300 ml/min. Samples were obtained at 6 hours and at 10 hours. The reactor and loop were submerged in a fluidized sand bath having a temperature of 180° C., and after the indicated reaction time, the reactor was pulled from the sand bath and FAV was measured according to ASTM D789-07. After SSP, the reactor was purged with nitrogen air flow at 300 ml/min until temperature was reduced to 20° C.

Table 6 below provides the experimental results for Examples 28-34.

TABLE 6

| EX. NO. | P CHARGED (ppm) | CONDITION | FAV | EXT. | UN-WASHED P ppm | WASH-ED P ppm |
|---|---|---|---|---|---|---|
| 28 | 0 | Unwashed | 44.6 | 14 | 0 | |
|  |  | Washed | 58.6 | 0.39 |  | 0 |
|  |  | SSP-6 hrs | 118 |  |  | 0 |
|  |  | SSP-10 hrs | 152 |  |  | 0 |
| 29 | 1 | Unwashed | 49.0 | 14.00 | 0.9 | |
|  |  | Washed | 69.7 | 0.62 |  | 0.7 |
|  |  | SSP-6 hr | 117.0 | 0.55 |  | |
|  |  | SSP-10 hrs | 139.0 | 0.53 |  | |
| 30 | 3 | Unwashed | 55.3 | 13.00 | 3.1 | |
|  |  | Washed | 77.9 | 0.60 |  | 1.5 |
|  |  | SSP-6 hrs | 132.0 | 0.59 |  | |

TABLE 6-continued

| EX. NO. | P CHARGED (ppm) | CONDITION | FAV | EXT. | UN-WASHED P ppm | WASH-ED P ppm |
|---|---|---|---|---|---|---|
|  |  | SSP-10 hrs | 161.0 | 0.57 |  |  |
| 31 | 5 | Unwashed | 57.5 | 10.00 | 5.1 |  |
|  |  | Washed | 72.2 | 0.83 |  | <2.1 |
|  |  | SSP-6 hrs | 139.0 | 0.52 |  |  |
|  |  | SSP-10 hrs | 170.0 | 0.5 |  |  |
| 32 | 10 | Unwashed | 51.8 | 10.0 | 8.7 |  |
|  |  | Washed | 65.0 | 0.5 |  | 9.0 |
|  |  | SSP-6 hrs | 122.0 |  |  |  |
|  |  | SSP-10 hrs | 159.0 |  |  |  |
| 33 | 20 | Unwashed |  |  | 23 |  |
|  |  | Washed | 74.7 | 0.7 |  | 22 |
|  |  | SSP-6 hrs | 173.0 |  |  |  |
|  |  | SSP-10 hrs | 259.0 |  |  |  |
| 34 | 30 | Unwashed | 53.7 | 11 | 32 |  |
|  |  | Washed | 65.4 | 0.52 |  | 17 |
|  |  | SSP-6 hrs | 159 |  |  |  |
|  |  | SSP-10 hrs | 247 |  |  |  |

Figure 7:
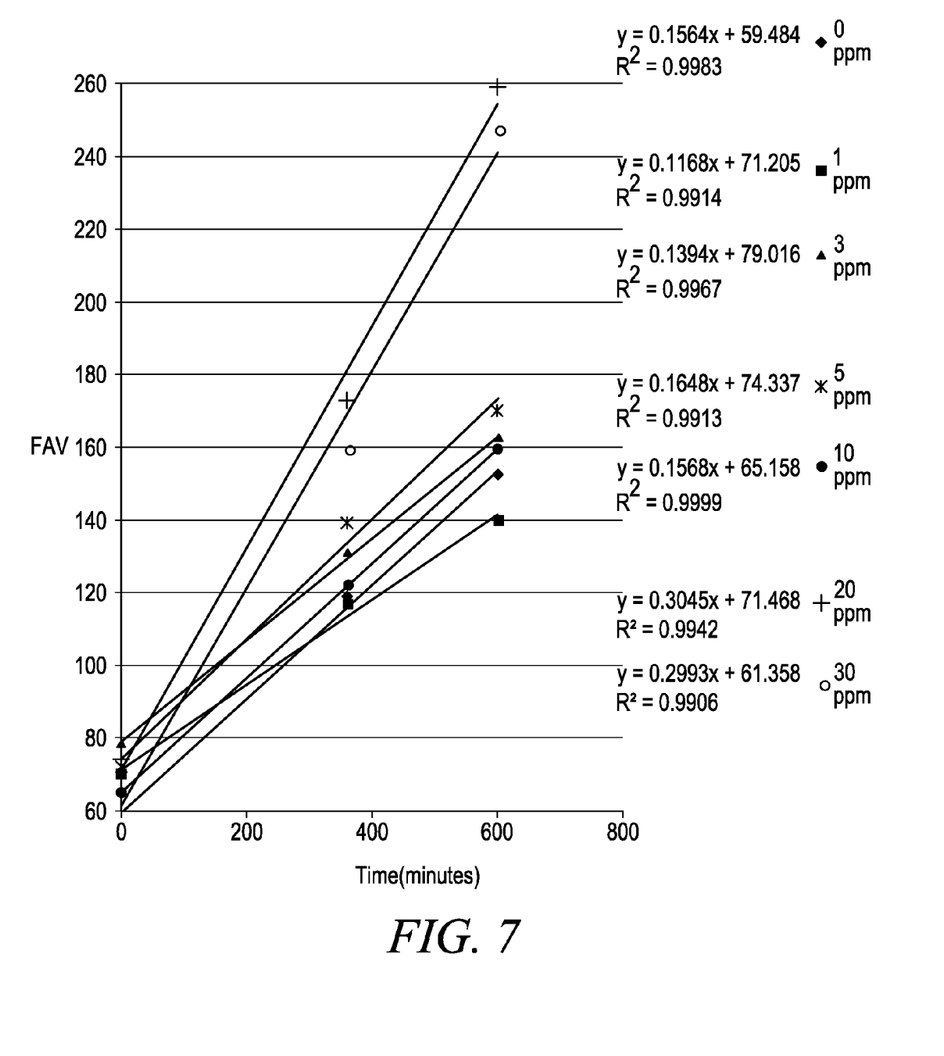
FIG. 7 is a graph summarizing the effects of residual phosphorous amounts and reaction times on the FAV values obtained during SSP.

The results, set forth in FIG. 7, illustrate several trends. For a given initial P loading, the FAV increases as SSP time increases. The reaction rate, given in terms of FAV/hr, increases at a generally constant rate for initial P amounts of 0 ppm to 10 ppm. As indicated by the trendline equations, the slopes are reasonably similar for these Examples. There is a step increase in FAV for initial P amounts of 20 ppm and 30 ppm, as the graphed data illustrates a relatively steeper trendline slope.

Figure 8:
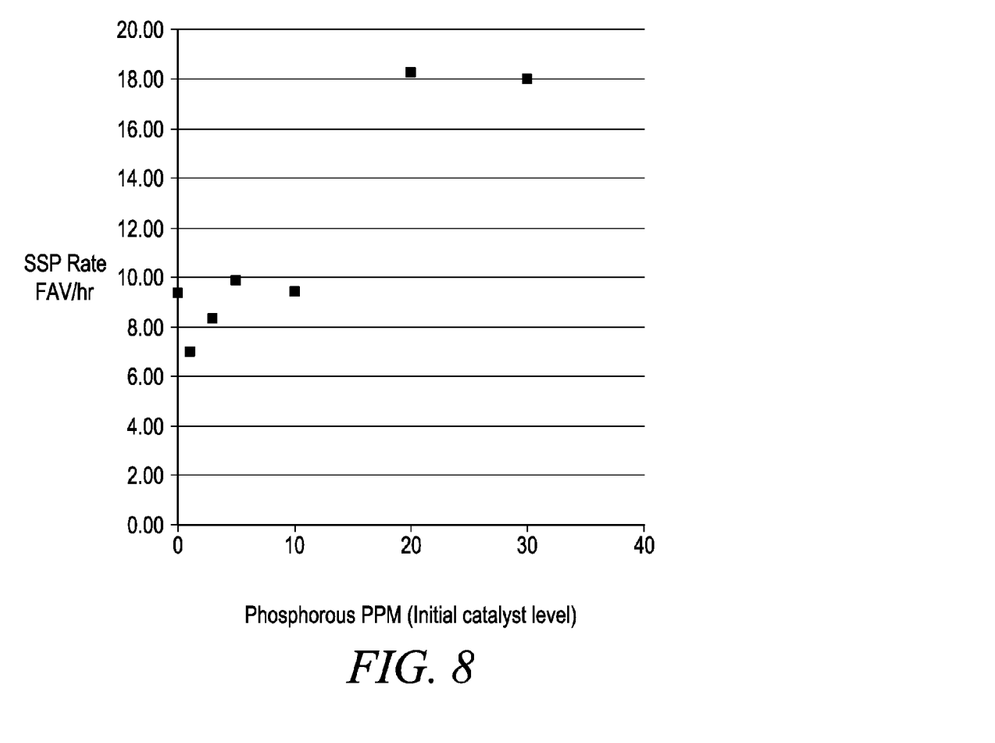
FIG. 8 is a graph illustrating the effect of initial phosphorous amounts on SSP rates.

This step increase can also be seen in FIG. 8. The data for the lower initial P amounts (0 ppm to 10 ppm) illustrate an SSP rate (FAV/hr) generally in the 8 to 10 FAV/hr range while the data for the higher initial P amounts (20 ppm and 30 ppm) illustrate an SSP rate around 18 FAV/hr.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The invention claimed is:

1. A method of forming a high viscosity polyamide material comprising:
   combining at least one lactam monomer, and a sufficient amount of at least one phosphorous containing catalyst to provide a mixture with an initial catalyst concentration of at least 1 ppm phosphorous;
   reacting the mixture under temperature conditions suitable to form a low viscosity polyamide material;
   removing extractables from the polyamide material, wherein at least 0.1 ppm phosphorous remains in the polyamide material after said removing step; and
   subjecting the washed polyamide material to conditions suitable for causing solid state polymerization to increase the viscosity of the polyamide material.

2. The method of claim 1, further comprising, after said reacting step and prior to said removing step, of quenching the reaction at a viscosity of about 50 FAV.

3. The method of claim 2, wherein said step of subjecting the washed polyamide material to conditions suitable for solid state polymerization comprises increasing the viscosity to a viscosity higher than about 50 FAV.

4. The method of claim 1, wherein the at least one monomer comprises caprolactam.

5. The method of claim 1, wherein the phosphorous containing catalyst comprises hypophosphorous acid.

6. The method of claim 1, wherein the reacting step is carried out at a temperature that is at least as high as the melting temperature of the resulting polymer.

7. The method of claim 1, wherein the low viscosity polyamide material has an FAV of less than 90 FAV prior to solid state polymerization.

8. The method of claim 1, wherein the polyamide material is washed in a solution comprising hot water to remove extractables.

9. The method of claim 1, wherein at least 0.5 ppm phosphorous remains after removing extractables.

10. The method of claim 1, wherein at least 1 ppm phosphorous remains after removing extractables.

11. The method of claim 1, wherein the initial catalyst concentration is from about 1 ppm phosphorous to about 30 ppm phosphorous.

12. The method of claim 1, wherein after the removing extractables step, a residual phosphorous content in the polyamide material is from about 0.1 ppm to about 15 ppm phosphorous.

13. The method of claim 1, wherein solid state polymerization occurs at a temperature between about 140° C. and about 200° C.

14. The method of claim 1, wherein solid state polymerization occurs at a temperature of no less than 165° C. to about 200° C.

15. The method of claim 1, wherein solid state polymerization occurs at a rate of at least 9.6 FAV/hour.

16. The method of claim 1, wherein the polyamide material after solid state polymerization has a viscosity that is at least 15 FAV greater than the viscosity prior to solid state polymerization.

17. The method of claim 1, wherein the polyamide material after solid state polymerization has a viscosity that is at least 30 FAV greater than the viscosity prior to solid state polymerization.

18. A method of forming a high viscosity polyamide material comprising:
   reacting at least one lactam monomer and water under temperature conditions suitable to form a low viscosity polyamide melt;
   adding a sufficient amount of at least one phosphorous containing catalyst to the melt such that the melt has an initial catalyst concentration of at least 10 ppm phosphorous;
   forming a solid polyamide material from the polyamide melt; and
   subjecting the solid polyamide material to conditions suitable for causing solid state polymerization to increase the viscosity of the polyamide material.

19. The method of claim 18, further comprising a step, prior to said subjecting step, of removing extractables from the solid polyamide material, wherein at least 0.1 ppm phosphorous remains in the polyamide material after said removing step.

20. A method of forming a high viscosity polyamide material comprising:
   reacting at least one lactam monomer and water under temperature conditions suitable to form a low viscosity solid polyamide material;
   removing extractables from the solid polyamide material;
   applying a phosphorous containing catalyst to the solid polyamide material; and
   subjecting the solid polyamide material to conditions suitable for causing solid state polymerization to increase the viscosity of the polyamide material.

* * * * *